_United States Patent_ [19]

Yoshie et al.

[11] Patent Number: 4,528,052
[45] Date of Patent: Jul. 9, 1985

[54] PROCESS FOR MAKING A RADIAL TIRE

[75] Inventors: Atsuyoshi Yoshie; Hiroyuki Karasawa, both of Mie, Japan

[73] Assignee: Toyo Tire & Rubber Co., Ltd., Osaka, Japan

[21] Appl. No.: 450,555

[22] Filed: Dec. 16, 1982

[30] Foreign Application Priority Data

Feb. 17, 1982 [JP] Japan .................................. 57-25077

[51] Int. Cl.³ .................. B29H 17/26; B29H 5/02
[52] U.S. Cl. .................................... 156/117; 156/130;
156/130.3; 156/130.5; 264/326; 264/501
[58] Field of Search ............ 156/117, 123, 124, 128.1,
156/130, 130.3, 130.5, 110.1, 128.6, 129, 397,
405.1, 421.2; 264/326, 501

[56] References Cited

U.S. PATENT DOCUMENTS 2,814,331 11/1957 Vanzo et al. ........................ 156/130
2,939,502 6/1960 Hindin et al. ................... 152/361 R
3,503,432 3/1970 Maiocchi ............................ 152/176
3,960,628 6/1976 Snyder ................................ 156/123
3,979,536 9/1976 Neville et al. ...................... 156/117
4,146,415 3/1979 Caretta et al. ..................... 156/130
4,269,646 5/1981 Miller et al. ....................... 156/130
4,293,019 10/1981 Maiocchi ....................... 152/361 R Primary Examiner—Lois E. Boland
Attorney, Agent, or Firm—Wenderoth, Lind & Ponack

[57] ABSTRACT

A process for making a radial tire comprises steps of transforming a cylindrical tire carcass assembly into a toroidal shape, laying over a given number of belts, winding a plurality of synthetic fiber threads, laying over a tread cap, transforming the tire carcass assembly to such an extent that the upper surface thereof contacts substantially all over the lower surface of the belts, joining integrally these tire components to form a green tire, and subjecting the green tire to vulcanization in a vulcanizing mold.

The synthetic fiber threads are wound over the belts in the circumferential direction with a space of 5 mm to 15 mm left between each adjacent thread in the range of more than 70% of the width of the belts.

2 Claims, 7 Drawing Figures

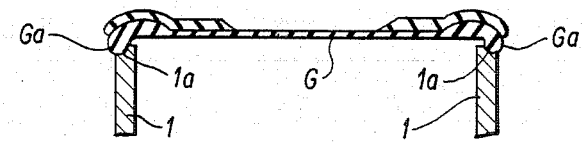
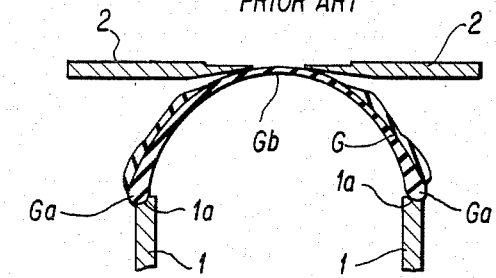
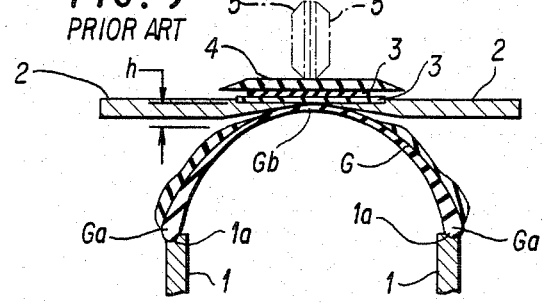
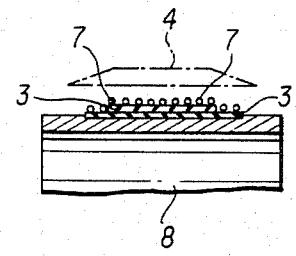
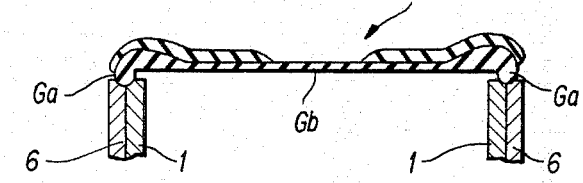

PROCESS FOR MAKING A RADIAL TIRE

BACKGROUND OF THE INVENTION

1. Field of the Invention

The present invention relates to a process for making a radial tire. A radial tire is much superior to a bias tire in steering property and enjoys a great demand in the public market. But the manufacturing process of a radial tire is more complicated than that of a bias tire and a lot of non-uniform and non-standardized radial tires have been manufactured. It is therefore an important problem for those concerned in the tire manufacturing industry to reduce the number of such defective products.

2. Description of the Prior Art

An example of a conventional process for making a radial tire will be briefly described hereunder. In the first step, as shown in FIG. 1, bead portion Ga, Ga of a cylindrically formed tire carcass assembly G comprising a carcass ply layer, bead portions and side wall rubbers are mounted to rims 1a, 1a of a pair of flanges 1, 1 of a radial tire building machine. Thereafter, as shown in FIG. 2, belt rings 2, 2 prepared beside the flanges 1, 1 approach each other to a given position and also both flanges 1, 1 approach each other while incorporating compressed air into the space surrounded by the flanges 1, 1 and the tire carcass assembly G. Thus, the tire carcass assembly G is expanded and transformed into a toroidal shape with the top Gb thereof being exposed through the gap between the edges of the belt rings 2, 2. Thereafter, as shown in FIG. 3, a plurality of belts 3, 3 and a tread cap 4 are laid over in turn in an endless form spanning between both of the belt rings 2, 2 and joined together with the operation of a pair of stitch rollers 5, 5. The belt rings 2, 2 are moved back to the stand-by position. Thereafter, stitch rollers 5, 5 are operated again, so that the lower surface of the lowest belt 3 and the lower surface of the side edges of the tread cap 4 are joined onto the upper surface of the tire carcass assembly G.

A green tire thus obtained, however, has such a drawback that the equatorial diameter is expanded with the approximately uniform expansion of the green tire in every direction by a shaping pressure added therein. If the equatorial diameter of a green tire is formed so as to fit the inner size of a vulcanizing metal mold, the equatorial diameter of the green tire becomes larger than that of the vulcanizing metal mold at the time of vulcanization when the vulcanizing metal mold is closed by applying a shaping pressure to the green tire. As a result, a part of the green tire is bitten between an upper mold and a lower one. Accordingly, there is employed such a measure as making the equatorial diameter of a green tire smaller by 6% to 7% than that of a vulcanizing metal mold so as to prevent the bite trouble. This measure, however, induces the increase of a dimensional difference between the cross sectional shape of a vulcanizing metal mold and that of a green tire at the portions other than the equatorial portion of a green tire. As a result, a big slip occurs among the structural members of a green tire at the vulcanization stage with the shaping pressure, thereby causing the non-uniformity of tires produced. Besides, as the belts 3, 3 and the tread cap 4 are joined onto the upper surface of the tire carcass assembly G which was transformed into nearly semicircular shape in cross section, the distance (see FIG. 3) from the upper surface of the tire carcass assembly G to the lower surface of the side edges of the belt 3 becomes large. As a result, the belt 3 and the tread cap 4 undergo great deformation when they are pressed by the stitch rollers 5, 5 and thereby wrinkles are often induced. Thus the uniformity of products becomes low.

SUMMARY OF THE INVENTION

It is an object of the present invention to provide an improved process for making a radial tire having good uniformity.

According to the present invention, there is provided a process for making a radial tire comprising a step of transforming a cylindrical tire carcass assembly comprising a carcass ply layer, bead portions and side wall rubbers into a toroidal shape and laying over given plies of belts in an endless form on the upper surface thereof, a step of winding a plurality of synthetic fiber threads over the belts in the circumferential direction with a space of 5 mm to 15 mm left between each other in the range of more than 70% of the width of the belts and laying over a tread cap thereon, a step of subjecting a tire carcass assembly to a transformation to such an extent as the upper surface thereof contacts substantially all over the lower surface of the belt to form a green tire, and a step of subjecting said green tire to vulcanization in a vulcanizing metal mold.

BRIEF DESCRIPTION OF THE DRAWINGS

The present invention will now be more particularly described with reference to the accompanying drawings, in which:

FIG. 1 to FIG. 3 are cross sectional views showing a conventional process of making a radial tire together with the main part of a tire building machine;

FIG. 7 is a cross sectional view showing the second embodiment together with the main part of a tire building machine.

DETAILED DESCRIPTION OF THE PREFERRED EMBODIMENTS

Figure 4:
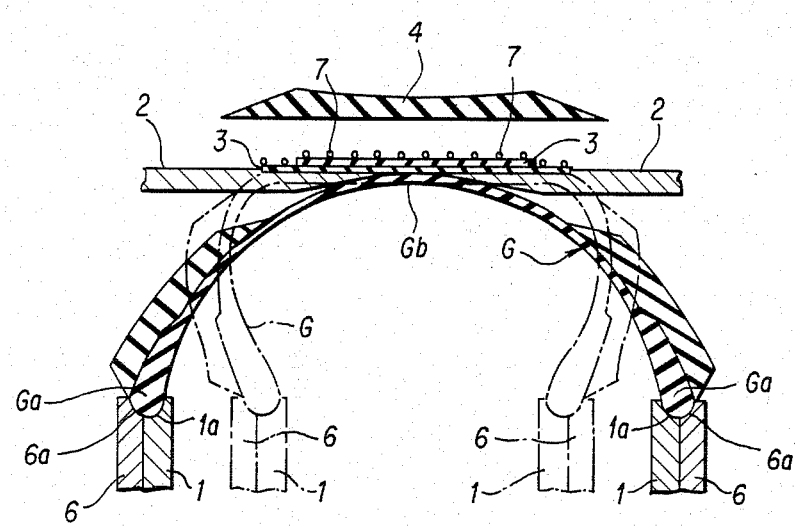
FIG. 4 is a cross sectional view showing the first embodiment according to the present invention together with the main part of a tire building machine.
Figures 5, 6:
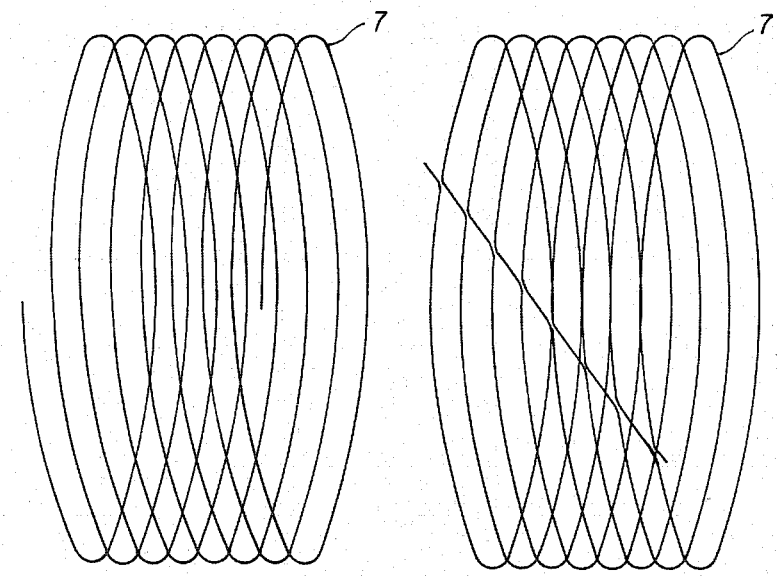
FIG. 5 and FIG. 6 are perspective views showing examples of a practical operation of winding thread.

Referring now to FIG. 4 to FIG. 6, there is disclosed the first embodiment of the present invention wherein a tire building machine equipped with a pair of belt rings 2, 2 sliding symmetrically along a main shaft (not illustrated) is used in like manner as shown previously in FIG. 1 to FIG. 3. As shown in FIG. 4, a tire forming machine use herein is provided with outer flanges 6, 6 adjacent to the outer surface of inner flanges 1, 1. A bead portion Ga of a tire carcass assembly G comprising a carcass ply layer, bead portions and side wall rubbers is sandwiched between the rim 6a of the outer flanges 6 which rim 6a contacts the outer surface of the bead portion Ga and the conventional rim 1a of the inner flanges 1 contacting the inner surface of the bead portion Ga.

The cylindrical tire carcass assembly G is transformed into a toroidal shape in like manner as in the prior art as shown with solid lines in FIG. 4 with the bead portion Ga, Ga retained by the flanges 1, 1, 6, 6. A plurality of belts 3, 3 are conventionally laid in an endless form over belt rings 2, 2 which are positioned close to each other. Thereafter, over the upper surface of the belt 3 are wound a plurality of synthetic fiber threads such as a single or a twine of synthetic spun yarn, monofilament or multifilament made from nylon 66, nylon 6, polyester, polyvinyl chloride, etc. with a given space left between each adjacent thread. A practical operation of winding can be made either by winding a long thread 7 spirally as shown in FIG. 5 or by winding a long thread 7 in a circumferential direction with each turn transferred in the axial direction so as to leave a given space between each adjacent thread. After operation of thread winding, a tread cap 4 is wound over the belts 3 and said belts 3, 3 thread 7 and the tread cap 4 are integrally joined together by pressing a pair of stitch rollers 5, 5 (shown only in FIG. 3). The belt rings 2, 2 are returned to a stand-by position. Thereafter, the flanges 1, 1, 6, 6 are further moved to get close to each other until they are positioned in line with the position of the side edges of the lowest belts 3, 3 in the direction of the tire rotating axis as shown by the broken line of FIG. 4 and thereby transforming the tire carcass assembly G as shown by the broken line so as to contact the upper surface thereof substantially all over the lower surface of the lowest belt 3. By handling again the stitch roller 5, the tire carcass assembly G, the belts 3, 3, the thread 7, and the tread cap 4 are integrally joined together. Thus the building process of a green tire is finished. By virtue of the installation of the outer flange 6 at the outer surface of the inner flange 1, the bead portion Ga of the tire carcass assembly G will not be detached from the rims 1a, 6a even when the flanges 1, 6 are moved to the position as shown by the broken line.

The green tire formed by the above described process is subjected to vulcanization by mounting it in a vulcanizing mold. The elongation of the diameter of the equatorial portion likely to be caused by the shaping pressure added to the green tire can be restrained by a plurality of threads 7 wound over the belts 3. The size of thread 7, the space left between each adjacent thread and the disposing area of the thread shall be determined so that the above restraining action may be effectively obtained. The size of thread 7 shall be determined depending upon the size of a tire, and the space left between each adjacent thread 7. The investigation reveals that the disposing space between each adjacent thread 7 shall be within the range of 5 mm to 15 mm. Any space less than 5 mm induces the waste of thread 7 and consequently reduce the operation efficiency. Moreover, the adhesive force between the belt 3 and the tread cap 4 is adversely affected and as a result, separation occurs at the interface between them. On the contrary, space more than 15 mm is too broad to attain the expected effect and the equatorial diameter of the green tire is elongated by the shaping pressure. The disposing area of the thread 7 shall be more than 70% of the width of the belt 3. In case of less than 70%, the portion outside the area is expanded by the shaping pressure and the expected effect can not be obtained.

As the elongation of the equatorial diameter caused by the shaping pressure is thus restrained by virtue of thread winding, the equatorial portion of a green tire is never bitten between the upper mold and the lower mold at the closed position of a vulcanizing mold even if the equatorial diameter of a green tire is made larger by 2% than that of the vulcanizing mold. A synthetic fiber is employed as a material of the thread 7. The thread 7 is readily elongated with the rise of temperature and the addition of the shaping pressure during vulcanization so that a green tire is readily transformed and fits the inside of the vulcanizing metal mold. Furthermore, because the equatorial diameter of the green tire can be made larger than that of a conventional green tire, structural members of a green tire slip less during vulcanization. Moreover, as the upper surface of the tire carcass assembly contacts substantially all over the lower surface of the belt 3, the deformation of the belt 3 and the tread cap 4 caused by the pressure of the stitch roller 5 is less, which results in diminution of wrinkles. Owing to less occurrence of wrinkles as well as slip, the uniformity of the products is greatly improved.

The second embodiment according to the present invention will now be described referring to FIG. 7. In this embodiment a tire building machine is provided with both a belt building drum 8 disposed outwardly of the flanges 1, 1, 6, 6 in the direction of the tire rotating axis and a belt transferring ring (not illustrated) disposed between the flanges 1, 1, 6, 6 and said belt building drum 8. The outer flanges 6, 6 are also mounted to the outer face of the flanges 1, 1 as in the case of the first embodiment.

The cylindrical tire carcass assembly G is retained by the flanges 1, 1, 6, 6 as in the case of the first embodiment. The belt building drum 8 is formed to be expansible in its diameter. A plurality of belts 3, 3 are wound in an endless form over the belt forming drum 8 with an expanded diameter.

Thereafter, a plurality of threads 7 are wound over the belts 3, 3 with a given space left between each adjacent thread 7, as in the case of the first embodiment. A tread cap 4 is wound over the belts 3 in an endless form. Said belts 3, 3, the thread 7, and the tread cap 4 are joined integrally by pressing a pair of stitch rollers 5 (not illustrated in FIGS. 4–7 but illustrated only in FIG. 3). A belt transferring ring (not illustrated) prepared between said flanges 1, 1, 6, 6 and the belt forming drum 8 is then transferred along a main axis (not illustrated) in the direction of the belt building drum 8 so as to retain said integral unit at the internal surface of the belt transferring ring, for example, by means of absorption of the outer surface of the tread cap 4. The diameter of the belt building drum 8 is then reduced. Thereby, said integral unit is separated from the belt building drum 8. The integral unit comprising the belts 3, 3 the thread 7, and the tread cap 4 retained by the belt transferring ring are transferred to the middle position between the inner flanges 1 and 1, as shown with the broken lines, by moving the belt transferring ring to the right. Thereafter, the cylindrical tire carcass assembly G is transformed so as to contact the upper surface thereof substantially all over the lower surface of the belt 3 by bringing flanges 1, 1, 6, 6 toward each other until they are positioned in line with the position of the side edges of the belt 3. The belt transferring ring is separated from the tread cap 4 and returned to the stand-by position. A pair of stitch rollers 5 (illustrated in only FIG. 3) are then pressed over the tread cap 4 to join the integral unit at the upper surface of the tire carcass assembly G, thus the building process is finished. The same effect as that of the first embodiment can be also obtained by this second embodiment. The size of the thread 7, the space left between each adjacent thread 7, and the disposing area of the thread 7 shall be determined as in the first embodiment.

As described above, a plurality of threads 7 are provided in parallel between the belts 3 and the tread cap 4 in this invention. Accordingly, the equatorial diameter of a green tire can be approached to that of a vulcanizing metal mold by making the equatorial diameter of a green tire larger than that of a conventional tire. Furthermore, as a synthetic fiber employed for a material of the thread 7, the thread 7 is readily elongated with the rise of temperature and the addition of the shaping pressure during vulcanization. Moreover, as the cylindrical tire carcass assembly is transformed to such an extent as to contact substantially all over the lower surface of the belt 3, the tread cap 4, and the belt 3 are less deformed by pressing a pair of stitch rollers 5 thereon. By these factors mentioned above, products enjoying a good uniformity can be obtained and non-standardized products are effectively diminished in number.

What is claimed is:

1. A process for making a radial tire comprising the steps of:

transforming a cylindrical tire carcass assembly including a carcass ply layer, bead portions, and side wall rubbers into a toroidal shape, laying over a given number of belts in an endless form on the upper surface thereof, winding a plurality of synthetic fiber threads over the top of the given number of belts in the circumferential direction, with a space of 5 mm to 15 mm left between each adjacent thread, in the range of more than 70% of the width of the belts, laying over a tread cap thereon, retaining said tire carcass assembly by sandwiching bead portions thereof between rims of outer flanges and inner flanges provided at a tire building machine, bringing the bead portions toward each other, contacting the upper surface of the tire carcass assembly substantially all over the lower surface of the lowest given number of the belts so that deformation of the belts and the tread cap is lessened, resulting in diminution of wrinkles, joining integrally the tire carcass assembly, the belts, the threads, and the tread cap to form a green tire having an equatorial diameter larger by about 2% than an equatorial diameter of a vulcanizing mold, so that less slipping of the green tire occurs in the vulcanizing mold, subjecting said green tire to vulcanization in the vulcanizing mold;

whereby uniformity of the radial tires produced is greatly improved.

2. A process for making a radial tire according to claim 1, wherein said threads comprise a single thread spirally wound over the belts.

* * * * *